(12) United States Patent
Vasudevan et al.

(10) Patent No.: US 10,838,968 B2
(45) Date of Patent: Nov. 17, 2020

(54) RECOMMENDING EXEMPLARS OF AN UNLABELED DATA-SET

(71) Applicant: INTERNATIONAL BUSINESS MACHINES CORPORATION, Armonk, NY (US)

(72) Inventors: Shrihari Vasudevan, Chennai (IN); Joydeep Mondal, New Delhi (IN); Richard H. Zhou, Palo Alto, CA (US); Michael Peran, Scarsdale, NY (US); Michael W. Ticknor, Covington, KY (US); Daniel Augenstern, Endwell, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 277 days.

(21) Appl. No.: 15/866,723

(22) Filed: Jan. 10, 2018

(65) Prior Publication Data

US 2019/0213273 A1  Jul. 11, 2019

(51) Int. Cl.
*G06F 16/2457* (2019.01)
*G06K 9/62* (2006.01)
*G06N 20/00* (2019.01)
*G06F 16/35* (2019.01)

(52) U.S. Cl.
CPC ........ *G06F 16/24575* (2019.01); *G06F 16/35* (2019.01); *G06K 9/6218* (2013.01); *G06K 9/6254* (2013.01); *G06K 9/6267* (2013.01); *G06N 20/00* (2019.01)

(58) Field of Classification Search
CPC ....... G06F 16/24575; G06K 9/62; G06K 9/00
See application file for complete search history.

(56) References Cited

U.S. PATENT DOCUMENTS

| 9,208,404 | B2 | 12/2015 | Lin et al. | |
|---|---|---|---|---|
| 9,218,364 | B1* | 12/2015 | Garrigues | G06F 16/5866 |
| 9,913,092 | B2* | 3/2018 | Chan | H04W 4/023 |
| 2006/0093208 | A1* | 5/2006 | Li | G06K 9/6276 382/159 |
| 2007/0005529 | A1* | 1/2007 | Naphade | G06F 16/48 706/16 |
| 2008/0319947 | A1* | 12/2008 | Latzina | G06F 16/334 |
| 2010/0063948 | A1* | 3/2010 | Virkar | G06N 20/00 706/12 |
| 2011/0135166 | A1* | 6/2011 | Wechsler | G06K 9/627 382/118 |
| 2014/0270536 | A1* | 9/2014 | Amtrup | G06K 9/00483 382/195 |

(Continued)

OTHER PUBLICATIONS

"Combining labelled and unlabeled data: a case study on Fisher kernels and transductive inference for biological entity recognition" (Cyril Goutte, Herve Dejean, Eric Gaussier, Nicola Cancedda, and Jean-Michel Renders; Aug. 2002; France).*

*Primary Examiner* — Giovanna B Colan
(74) *Attorney, Agent, or Firm* — Griffiths & Seaton PLLC

(57) ABSTRACT

Embodiments for recommending exemplars of a data-set by a processor. A selected number of exemplars may be labeled from one or more classes in a data-set. One or more class exemplars for each of the one or more classes in the data-set may be recommended according to similarities between the selected number of labeled exemplars and remaining data of the data-set.

20 Claims, 6 Drawing Sheets

(56) References Cited

U.S. PATENT DOCUMENTS

| | | | |
|---|---|---|---|
| 2016/0092959 A1* | 3/2016 | Gross | G06Q 30/0276 705/26.62 |
| 2017/0103284 A1* | 4/2017 | Rosen | G06K 9/6256 |
| 2017/0293838 A1 | 10/2017 | Min | |
| 2018/0018328 A1* | 1/2018 | Hyde | G16H 50/20 |
| 2018/0165554 A1* | 6/2018 | Zhang | G06K 9/6256 |

* cited by examiner

RECOMMENDING EXEMPLARS OF AN UNLABELED DATA-SET

BACKGROUND OF THE INVENTION

Field of the Invention

The present invention relates in general to computing systems, and more particularly to, various embodiments for recommending exemplars of an unlabeled data-set using a computing processor.

Description of the Related Art

Due to the recent advancement of information technology and the growing popularity of the Internet, a vast amount of information is now available in digital form. Such availability of information has provided many opportunities. Digital and online information is an advantageous source of business intelligence that is crucial to an entity's survival and adaptability in a highly competitive environment.

SUMMARY OF THE INVENTION

Various embodiments for recommending exemplars of an unlabeled data-set by a processor are provided. A selected number of exemplars may be labeled from one or more classes in a data-set. One or more class exemplars for each of the one or more classes in the data-set may be recommended according to similarities between the selected number of labeled exemplars. The one or more class exemplars thus recommended may subsequently be used, for example, in the context of supervised classification.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
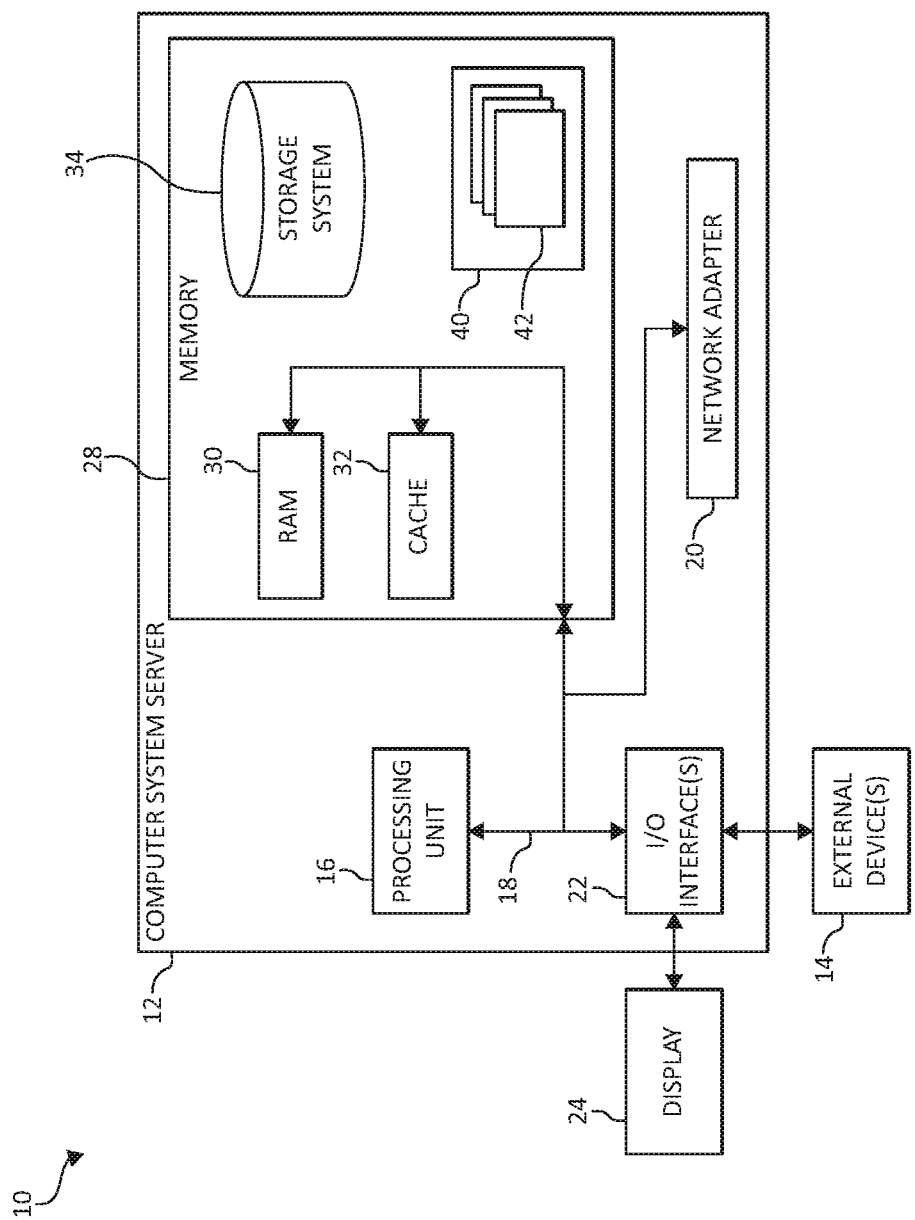
FIG. 1 is a block diagram depicting an exemplary cloud computing node according to an embodiment of the present invention.

As the amount of electronic information continues to increase, the demand for sophisticated information access systems also grows. Digital or "online" data has become increasingly accessible through real-time, global computer networks. The data may reflect many aspects of various organizations and groups or individuals, including scientific, political, governmental, educational, businesses, and so forth. In a computing environment with electronic information, labeling electronic information particularly in a multi-class data-set, may be extremely difficult and challenging. For example, if one or more persons/users of data are labeling the data, labeling errors and perceptual difference (between the persons/users) may occur. Furthermore, in the event a data-set is unlabeled, a current challenge in a computing system is recommending exemplars of data for an unlabeled data-set.

Accordingly, various embodiments are provided herein for recommending exemplars of an unlabeled data-set. An exemplar may be an example, model, pattern, copy, or an example or instance of data. A selected number of exemplars may be labeled from one or more classes in a data-set. One or more class exemplars for each of the one or more classes in the data-set may be recommended according to similarities between the selected number of labeled exemplars and remaining data of the data-set. The one or more class exemplars thus recommended may subsequently be used, for example, in the context of supervised classification.

In an additional aspect, a defined or limited number of crowdsourcing sources (e.g., a small set (e.g., 10 to 100) of subject matter experts ("SMEs")) may be recruited to label a defined or limited number of class exemplars. For example, each SME can label a small set (e.g., 10 to 100) of exemplars. The number of crowdsourcing sources or SMEs may also be data dependent, specifically on the number of classes the data is composed of—typical upper bound; the lower bound being 1. For example, assume there is a data-set with at least 100 types or classes of data. A number of SMEs may be required (e.g., anywhere between 1 and 100 SMEs) with each SME providing at least 10 to 100 labeled exemplars. The other exemplars may be selected by the present invention as described herein. The precise number between 1 and 100 SMEs may be dependent on issues/challenges such as, for example, a cost per SME, availability of SMEs at a selected time, etc. The greater the number of SMEs results in the greater or higher costs, but also provides a greater number and availability of expert selected exemplars as opposed to algorithm recommendations. Accordingly, in one aspect, the number of SMEs recruited may be, for example, at least 10-20% of the number of classes in the data-set and leaving the selection of the remaining exemplars to the selection via the mechanisms as described herein. This is the meaning of limited crowdsourcing effort coupled with similarity based exemplar selection (algorithm).

The similarities between the defined or limited number of class exemplars may be used to select a selected number (or a desired or preferred amount) of additional class exemplars. The additional class exemplars may be used as input in, for example, a supervised classification engine.

In an additional aspect, upon labeling a defined or limited number of class exemplars for a subset of the classes in the data-set via crowdsourcing, one or more class exemplars from a large, multi-class data-set (e.g., greater than 10,000 pieces of data with at least 1 class such as, for example ten, one hundred, or more than one thousand classes) may be identified according to similarities between the defined or a limited number of labeled class exemplars and the remainder of the data-set. Also, the defined or limited number of class exemplars for a subset of the classes may be used to learn or determine the number of classes in the data-set. Thus, it should be noted that the sizes of a large, multi-class data-set are for reference only and not to be construed as limiting. The mechanisms of the illustrated embodiments, as described herein, may apply to a data-set irrespective of size. The implementation of the present invention, however, may only be limited by computational complexity and resources available given the data-set.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
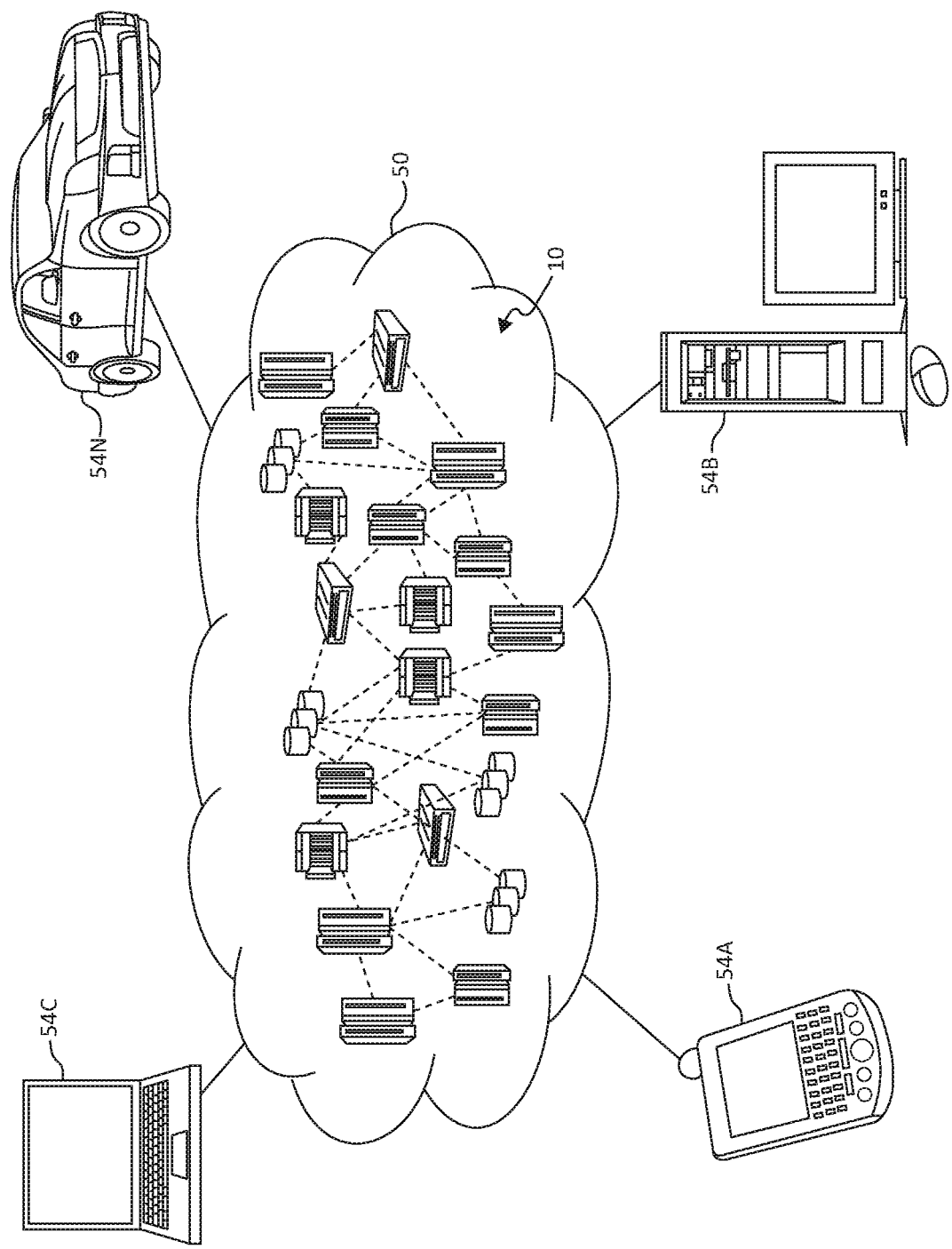
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
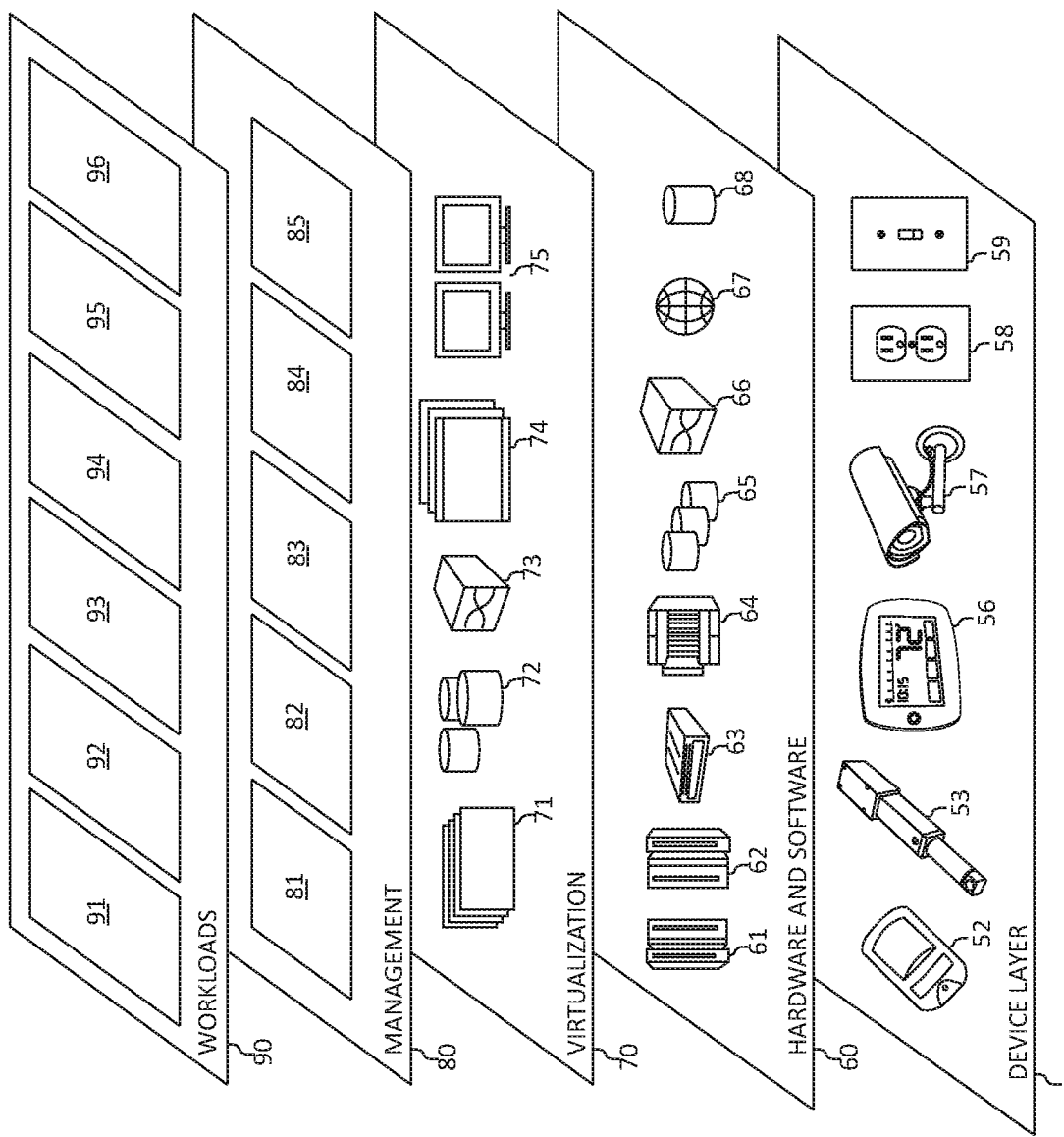
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for recommending exemplars of an unlabeled data-set. In addition, workloads and functions 96 for recommending exemplars of an unlabeled data-set may include such operations as data analysis (including data collection and processing from organizational databases, online information, knowledge domains, data sources, and/ or social networks/media, and other data storage systems, and predictive and data analytics functions. One of ordinary skill in the art will appreciate that the workloads and functions 96 for recommending exemplars of an unlabeled data-set may also work in conjunction with other portions of the various abstractions layers, such as those in hardware and software 60, virtualization 70, management 80, and other workloads 90 (such as data analytics and/or fungibility processing 94, for example) to accomplish the various purposes of the illustrated embodiments of the present invention.

As described herein, mechanisms of the illustrated embodiment provide a solution for recommending exemplars according to acquiring a small set of labeled exemplars of one or more classes through crowdsourcing (e.g., via one or more subject matter experts). Similarity between data may be used to recommend a desired number of exemplars for each of the classes in the data-set according to the labeled exemplars of one or more classes. Recommending the desired number of exemplars for each of the classes in the data-set based on similarities of the labeled exemplars of one or more classes with the remaining data of the data-set (e.g., remaining unlabeled data) may be based on principles of transductive learning, information retrieval/maximization, or a combination thereof. One or more class exemplars for each of the one or more classes in the data-set may be recommended according to similarities between the selected number of labeled exemplars and remaining data of the data-set.

Figure 4:
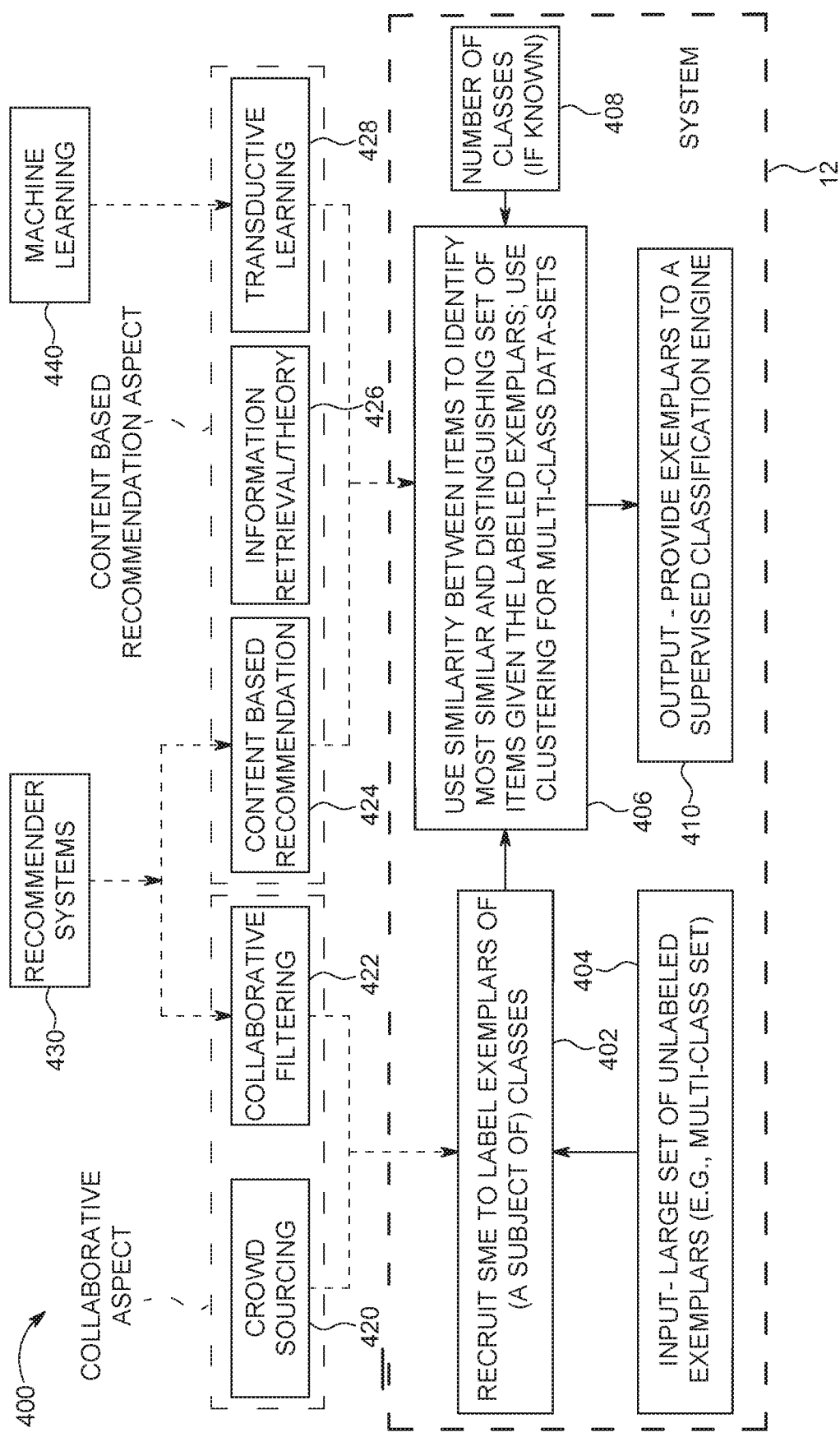
FIG. 4 is an additional block diagram depicting recommending exemplars of an unlabeled data-set in accordance with aspects of the present invention.

Turning now to FIG. 4, a block diagram 400 depicts recommending exemplars of an unlabeled data-set. In one aspect, one or more of the components, modules, services, applications, and/or functions described in FIGS. 1-3 may be used in FIG. 4. For example, computer system/server 12 of FIG. 1, incorporating processing unit 16, may be used to perform various computational, data processing and other functionality in accordance with various aspects of the present invention.

Also, as shown, the various blocks of functionality are depicted with arrows designating the blocks' 400 relationships with each other and to show process flow. Additionally, descriptive information is also seen relating each of the functional blocks 400. As will be seen, many of the functional blocks may also be considered "modules" of functionality. With the foregoing in mind, the module blocks 400 may also be incorporated into various hardware and software components of a system for recommending exemplars of an unlabeled data-set in accordance with the present invention. Many of the functional blocks 400 (such as, for example, those within computer system/server 12) may execute as background processes on various components, either in distributed computing components, or on the user device, or elsewhere. In one aspect, the computer system 12 (see FIG. 1) may be used (along with one or more other features, aspects, components, and/or hardware/software of FIGS. 2-3) for recommending exemplars of an unlabeled data-set.

At block 402, a computer system 12 may recruit and/or use one or more SMEs to label a selected number of exemplars from one or more classes in a data-set. A defined size of a set of unlabeled exemplars (which may have one or more classes) may be used as input into block 402, at block 404.

At block 406, one or more similarities between the selected number of labeled exemplars may be used to identify those exemplars (in the entire data-set) that are most similar and most dissimilar. That is, distinguishing sets of exemplars may be identified based on the selected number of labeled exemplars and a clustering operation may be used for the multi-class data-sets. Furthermore, as in block 408, if the number of classes in the data-set are known, this knowledge of the number of classes in the data-set may be used as part of block 406. From block 406, one or more class exemplars may be provided (e.g., used as output) to a supervised classification engine, as in block 410.

In one aspect, aspects of the present invention include those operations described in computer system 12. However, the computer system 12 may also be in communication with one or more recommender systems 430 and/or machine learning operations 440 functioning as a domain of information retrieval of data. Accordingly, a collaborative aspect and a content based recommendation aspect may be used in association with mechanisms of the illustrated embodiments (e.g., the computer system 12). In one aspect, the recommender systems 430 may include two different types of recommendation systems such as, for example, collaborative filtering 422 and content based recommendation 424.

In one aspect, elements of crowdsourcing 420 and collaborative filtering 422 may be used to collect one or more exemplars (e.g., user preferences such as a first user preferring "math courses" and a second user preferring "physics courses"). In one aspect, the elements of crowdsourcing 420 do not perform a full-crowdsourcing operation across the entire data-set. Also, the collaborative filtering 422 attempts to recommend similar entities to similar groups of users, which is separate from the operations described for functions performed in the computer system 12. Rather, the operations of the present invention performed in the computer system 12 are to obtain a set of labeled exemplars of one or more classes of a large, unlabeled, multi-class data-set.

In one aspect, the present invention uses a given a set of exemplars to recommend additional exemplars of remaining data of an unlabeled data-set. For example, using collaborative filtering 422, the mechanisms of the present invention may rely on receiving and/or retrieving labeled exemplars from one or more users (e.g., students). For example, the first user may provide the user preference of class "A" (e.g., a math course) while the second user a prefers course "B" (e.g., a physics course).

The content based (CB) recommendation system 424 may be used to identify a set of features that relate to a particular user. That is, the CB recommendation system 424 describes (unlabeled) items in terms of features (e.g., the entity that is intended to be recommended may be described in features). The CB recommendation system 424 does not customize a feature-set for a user and thereby recommend items, but rather, estimates a similarity between items. Said differently, data is described in terms of features so the present invention is enabled to determine and/or compute a similarity metric between data (e.g., labeled exemplars and remaining data in an unlabeled data-set). For example, assume the present invention is working with one or more text documents. Word tokens may be encoded into term-frequency inverse-document-frequency (TF-IDF) representations and/or feature vectors (e.g., "Word2Vec") that can be compared to estimate a similarity score. In the event the data is media data (e.g., an image) as compared to text data, the present invention may encode the entire media data (e.g., an image) into a single vector and/or extract only selected or certain features.

The information retrieval system 426 may use feature representations (e.g., word-vector) for textual descriptions (e.g., of various sources of text or data such as, for example, a text document, a web page, etc.), however, the mechanisms of the present invention are broader and may apply to any data type so long as a similarity function can be established between items of that particular data type.

In the absence of a fully labeled exemplar set and/or any other data/information, representative exemplars may be selected by maximizing information and selecting the most similar exemplars (e.g., identical/same class) or dissimilar (different class) exemplars to a reference set. In one aspect, a machine learning operation 440 may be used to assist and/or perform transductive learning, as in block 428. The objective of transductive learning is not to learn a classifier and then select exemplars, but rather, to infer (without an explicit model) exemplars as being of a certain class (or not associated with a class) with respect to a reference set. A clustering operation may be used that is similar to partitioning based transduction. The objective of the present invention is to provide exemplars to then learn an inductive (supervised) classification model.

Figure 5:
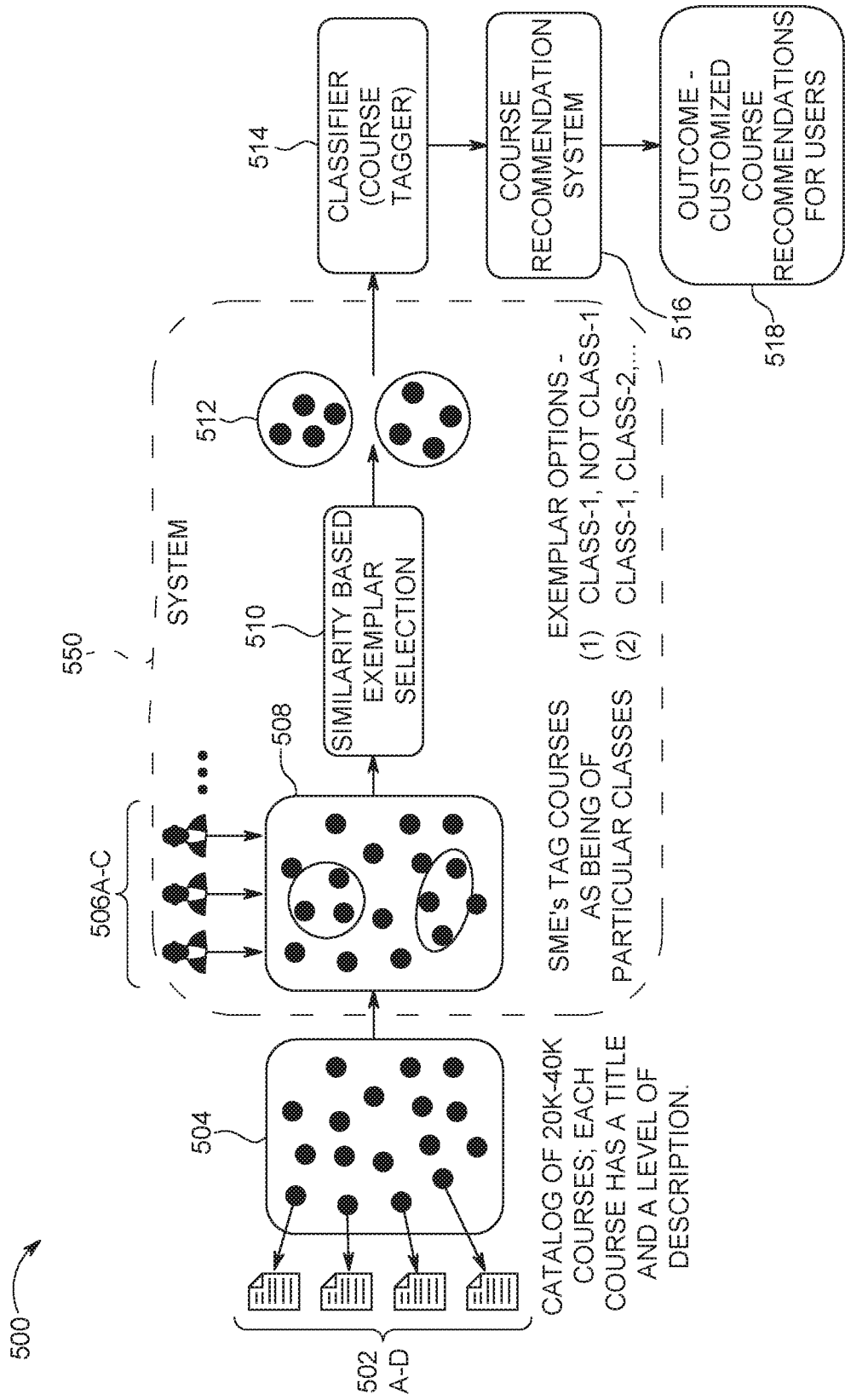
FIG. 5 is a block diagram depicting an example for recommending exemplars of an unlabeled data-set in accordance with aspects of the present invention.

Turning now to FIG. 5 is a block diagram 500 depicting an exemplary block diagram for recommending exemplars of an unlabeled data-set. In one aspect, one or more of the components, modules, services, applications, and/or functions described in FIGS. 1-4 may be used in FIG. 5. For example, computer system/server 12 of FIG. 1, incorporating processing unit 16, may be used to perform various computational, data processing and other functionality in accordance with various aspects of the present invention. In one aspect, FIG. 5 is just one exemplary use-case of the present invention and the mechanisms of the illustrated embodiments are not to be limited to this particular use-case or application. As described herein, FIG. 5 illustrates the providing of data to train a supervised classifier which is in turn used to recommend courses to users of the system.

Also, as shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality. With the foregoing in mind, the module blocks 500 may also be incorporated into various hardware and software components of a system for recommending exemplars of an unlabeled data-set in accordance with the present invention. Many of the functional blocks 500 may execute as background processes on various components, either in distributed computing components, or on the user device, or elsewhere.

As illustrated in block 504, one or more catalogs that may include one or more courses (e.g., 20,000 thousand (K) to 40,000 thousand (K) courses included in the catalog) having a title and a level of description (relating to the courses) may be used as input into block 508 of computer system 550. By way of example only, the catalog may be representative of a catalog of 20K to 40K courses and each dot (e.g., black colored dot) in block 504 represents a course that has a description represented by a page icon such as, for example, the page icons 502A-D associated with each dot (e.g., course). In one aspect, mechanisms of the illustrated embodiments may work with multiple catalogs of the same kind of data as long as the multiple catalogs are all combined into a catalog before application of the present invention. It should be noted that in one aspect, block 504 is similar to block 404 of FIG. 4 and block 510 is similar to block 406 of FIG. 4. Also, block 402 of FIG. 4 may be similar to blocks 506A-C and 508 of FIG. 5. Block 410 of FIG. 4 may also be similar to blocks 512, 514 of FIG. 5 (e.g., the supervised classification engine).

One or more crowdsourcing sources 506A-C(e.g., one or more SMEs 506A-C may be used) to tag (e.g., label) the courses as being of a particular or selected class. One or more class exemplars (e.g., a desired number, a preferred amount, and/or an entire listing of exemplars) may be selected according to similarities between the labeled data (of one or more classes) and all other data (of one or more classes) (e.g., similarity based exemplar selection), as in block 510. As in block 512, an output of a set of exemplars is provided. That is, block 512, is the outcome of similarity based exemplar selection (e.g., the output set of exemplars). The outcome of similarity based exemplar selection may be of one of two kinds: 1) class-1 and not class-1, and 2) class-1, class-2, class-3, etc. For example, the 1) class-1 and not class-1 may be 100 math courses (e.g., class-1) and 100 non-math courses (e.g., not class-1) and 2) class-1, class-2, class-3, etc. may be 100 math courses (e.g., class-1), 100 physics courses (e.g., class-2), 100 biology courses (e.g., class-3), etc.

The exact form of the outcome of similarity based exemplar selection may depend on the input requirements of a classifier 514 (e.g., a supervised classification engine 514). If we are learning a binary classifier, we go with outcome (1). If we are learning a multi-class classifier, we go with (2) unless we want to learn a binary classifier for each class separately, in which case we would use outcome (1) taken separately for each class.

The one or more class exemplars may be provided to the classifier 514 (e.g., course tagger) to learn multi-class data that may be used in remaining courses in the pool of unlabeled courses (e.g., the remaining pool of 20K-40K unlabeled courses). For example, a math professor labels for a user ten ("10") math courses and similarly there may be 10 physics and biology courses that have been labeled. The present invention may use these labeled exemplars to select one or more exemplars (in the catalog of 20K-40K courses) of math, physics, biology and even potentially alternative courses such as, for example, psychology, chemistry, or other courses. Assuming the user obtains 20 exemplars in total, which includes the originally labeled exemplars and additional exemplars of each course, the 20 exemplars may be supplied to a supervised classifier to learn a multi-class classifier (math, physics, chemistry, and the like) that can classify the remaining courses in the pool of 20-40K unlabeled courses. Such a classifier may be useful within the context of a course-recommender system that is used, for example, by one or more users (e.g., students) to pick courses of interest. The use of the classifier is useful in the scenario where the data (e.g., the catalog) includes new data (e.g., a new course) which has limited, prior information (unlabeled or class unknown) about the new data. In short, the classifier of block 514 may tag a course for customized course recommendations. In block 516, a course recommendation system may be employed to recommend one or more courses according to the classified and/or labeled exemplars. In this way, customized course recommendations of the various courses from catalogs 502A-D may be created, as in block 518. Moreover, computer system 550 illustrates one or more exemplar options: (1) class-1, not class-1 (e.g., math courses and non-math courses), and/or (2) class-1, class-2, class-3, . . . , etc. (e.g., math courses, physics courses, chemistry courses, etc.)

In one aspect, the identification of the one or more class exemplars from a large, multi-class data-set may be applied to one or more various possible use-cases for the challenge of selecting exemplars (e.g., "exemplar selection").

To further illustrate the selection of the one or more exemplars, the following three use-cases (problems and assumptions) are provided herein, by way of example only. (Other use-cases may also be applicable). Case 1 is a binary situation with positive exemplars (e.g., "math courses") and negative exemplars (not-math courses) of a class in a data-set (e.g., there are only two possibilities in selecting exemplars—positive exemplars or negative exemplars). Case 2 is a multi-class with a number of known classes of a data-set (e.g., math courses, physics courses, chemistry courses, and the like). The known classes in case 2 are either approximately known (e.g., a "guess") or exactly known. Case 3 may be a multi-class in a data-set with a number of unknown classes.

Accordingly, one or more assumptions and the use-cases (e.g., use-cases 1-3) may be applied and used as follows. As a preliminary matter, let the total entities ($e_i$) be equal to "N" ($e_i$=N), the total classes be equal to "K" (which total number of classes may or may not be known), with P being the desired number of exemplars per course). This is because since at this point the present invention is using N unlabeled data, the present inventions may be unable (at this point in time) to select exemplars of a specific class. (The only way to do this would be classifying first and then selecting the exemplars.) A pairwise distance matrix "S" may be used to estimate a distance or dissimilarity between the entities (e.g., a range [0; 1]). The entities of the exemplars may be documents, images or any other kind of data.

Case 1 may be where positive exemplars of 1 class (e.g., $N_1$ of entities) are provided with K unknown classes and negative exemplars of that class are required. For example, as used in the example of case 1, positive may represent exemplars of a user preference for a course of study (e.g., math courses) and "negative" may represent exemplars of non-preferences of the user for a course of study (e.g., courses that are not math courses (e.g., physics, chemistry, biology, etc.)). Finding one or more positive exemplars (e.g., more math courses) is equal to finding more exemplars similar to the labeled exemplars (e.g., the labeled math courses). Here, case 1 may be considered as a binary (only 2 classes of a data-set) problem of positive exemplars (e.g., labeled exemplars) and negative class exemplars. In this case, there may also be two sub-problems: case 1a—finding a number of appropriate negative exemplars (P exemplars) and case 1b—finding a number of additional positive exemplars (e.g., when ($N_1$<P)). It should be noted that in the absence of any other information "appropriate" may be considered as most similar exemplars or dissimilar exemplars. In case 1a, the present invention involves finding most dissimilar exemplars to the given $N_1$ positive, labeled exemplars. In case 1b, the present invention involves finding the most similar exemplars to the given $N_1$ of entities.

More specifically, for case 1, the present invention may apply the follow operations. For every pair of the $N_1$ positive/labeled exemplars, the pairwise distance matrix "S" may be set as $S(e_x;e_y)$ equal to 0 (X, Y∈[1, $N_1$]). For each of the N–$N_1$ remaining exemplars ($e_z$), the present invention may determine or compute $\Sigma S(e_j; e_z)$ where J runs over a set of positive exemplars (J∈[1, $N_1$])) (e.g., iterates over by computing the distance between each of the N–$N_1$ unlabeled courses to the $N_1$ labeled courses), which may be denoted as a sum of distances "SD" with respect to given exemplars. A set of N–$N_1$ remaining exemplars may be sorted in an ascending order of SD (lowest total distance to highest total distance). For case 1a, exemplars from the right end of set (highest total distance) may be selected. For case 1b, exemplars from the left end (lowest total distance) of the set may be selected. Thus, the present invention incorporates aspects of frequency and rank/value. Thus, more frequently occurring exemplars (as compared to other exemplars) and most similar (by value/rank) exemplars are more similar to the given labeled set.

Case 2 may be where labeled exemplars are from classes "C" that is less than K (e.g., C<K) classes provided ($N_i$, $i\in[1, c]$) (e.g., $N_1$, $N_2$, $N_3$, ..., courses of class-1, class-2, class-3 etc. are provided and $N_1$ being equal to or less than the exemplars of the class i), K total classes are known (e.g., exactly known or an approximate guess of known classes), and with "P" desired exemplars per class type. For example, $N_1$ exemplars of class-1 (see FIG. 5) and $N_2$ exemplars of class-2 where $N_1$ is less than and/or equal to P exemplars (e.g., $N_1<=P$) and $N_2$ exemplars are less than and/or equal to P (e.g., $N_2<=P$) and exemplars of the remaining classes may not be provided. In one aspect, there may be special cases that have equal sized data-clusters and all exemplars desired (e.g., P=N/K) and preferred (e.g., desired) numbers of desired exemplars per class type such as, for example, ($P_i$, $i\in[1, K]$).

Given K known total classes, a clustering procedure may be used, subject to the constraint that each of the K clusters must have less than and/or equal to P entities (e.g., $k\geq P$) assigned to each of the K clusters. For clusters with less than P labeled exemplars that are provided, the present invention may apply case 1b (as described herein) to identify the P labeled exemplars. For each cluster with no labeled exemplars, the present invention may use a set of all given labeled exemplars and may find exemplars in each cluster that are most dissimilar to this set (i.e., the pairwise 2 class problem of case 1a).

For case 2, the present invention may apply the follow operations/steps. Step 1) For every pair of entities ($e_x$:$e_y$) of the $N_i$(X, Y$\in[1, N_i]$) positive exemplars of class i ($i\in[1, c]$), the pairwise distance matrix "S" may be set as S($e_x$:$e_y$) equal to zero "0."

Step 2) The set of all provided labeled exemplars across all c classes may be denoted as Q, where Q may be the desired number of exemplars per class and P is the set of all labeled exemplars.

Step 3) A clustering operation may be performed/executed to cluster the N entities into K clusters. Medoids $M_I$ ($i\in[1, K]$) may be obtained and clustered. It should be noted that the clustering operation can be any algorithm/operation adapted or configured to work with a min-cluster size constraint. Since a distance/dissimilarity matrix is used, partitioning around medoids ("PAM") clustering operation may be used. Using data/feature vectors, a K-means operation may also be used.

Step 4) If each of the clusters have entities less than and/or equal to P entities (this scenario is more likely when N>> K>> P), the sub-steps of step 4 described below may be skipped and proceed to step 5.

Sub-steps of step 4) From the pairwise distance matrix S, a distance matrix ("D") may be created between medoids and the entities to be clustered. A value of each element may be the distance between the medoid and the entity (e.g., the entity in consideration) minus the distance between the entity and the medoid closest to the entity (e.g., the difference between assigning the entity to a particular medoid and assigning the entity to its closest medoid).

Repeat P entity iterations for each medoid (e.g., representative objects of a data-set), by selecting an entity with a lowest value in a corresponding row of distance matrix "D", assigning to a medoid, and/or removing the column corresponding to the entity from the distance matrix "D". It should be noted that to avoid being medoid-order dependent, in each P entity iteration, the medoid based on the lowest value (in a row in D) may be selected, subject to the constraint that a medoid is processed once only per iteration. Each medoid will at this stage have P entities associated with each of the medoids. Each of the remainder entities (columns in the distance matrix "D") may be associates with the nearest medoids (e.g., using the pairwise distance matrix "S"). The result may be a PAM variant where each cluster will have at least the desired or preferred number of P entities.

Step 5) For each of the c classes for which some labeled exemplars (which are less than P entities) are provided, the pairwise similarities of only the elements within this cluster (from the pairwise distance matrix "S") may be used to select the most similar exemplars (to the given or provided exemplars) based on the approach in case 1b, and is a binary problem within each cluster.

Step 6) For each of the remaining K–c clusters, P most dissimilar exemplars to the set P may be identified by applying the approach in case 1a (e.g., the most dissimilar exemplars are chosen as exemplars of other classes). Thus, the present invention may find exemplars (of each of the other classes) that are most dissimilar to the set of all given or provided labeled exemplars (Q) (e.g., pairwise 2 class problem similar to case 1a).

Step 7) The present invention then produces the result that is P exemplars from each of the K classes that the data is known to be composed of.

Case 3 may be where exemplars are from C that is less than K (e.g., C<K) classes provided ($N_i$, $i\in[1, c]$ where i ranges from i to C such as, for example, a user gets 10 labeled math courses, 10 labeled physics courses, and 20 labeled biology courses), the number K of classes is unknown, with "P" exemplars per desired class. For example, $N_1$ exemplars of class-1 (see FIG. 5) and $N_2$ exemplars of class-2 where $N_1$ is less than and/or equal to P exemplars (e.g., $N_1<=P$) and $N_2$ exemplars are less than and/or equal to P (e.g., $N_2<=P$) and exemplars of the remaining classes may not be provided.

A clustering operation may be performed such as, for example, the clustering operation described herein for case 2, subject to given K known total classes, a clustering procedure may be used, subject to the constraint that $$\hat{K} \in \left[C, \frac{N}{P}\right]$$

clusters must have entities that are greater than and/or equal to P entities that are assigned to the $$\hat{K} \in \left[C, \frac{N}{P}\right]$$

clusters. It should be noted that K is the known total classes, "$\hat{K}$" is estimated or guessed total classes from the data.

The $\hat{K}$ number of clusters may be found (and/or "guessed") as the smallest value beyond which the average of within a cluster sum of distances (e.g., a metric for PAM) does not decrease significantly, while maintaining the minimum cluster size constraint. For example, the $\hat{K}$ number of clusters may be found by one of two ways: 1) a statistical significance test, and/or 2) by plotting the measure, which will taper off beyond a certain number of clusters and this is a good guess of the number of clusters. Thus, the $\hat{K}$ number of clusters may be found by iteratively increasing the number of clusters, estimating the metric for PAM, plotting/comparing across different numbers of clusters and identifying the "elbow" of the curve; the approach is accordingly known as the elbow method. In one aspect, the elbow method is a method of interpretation and validation of consistency within cluster analysis designed to help find the appropriate number of clusters in a data-set. The significance can be decided by a user set threshold or visually.

For K-means clustering, the decrease in the ratio of "within-cluster-sum-of-squares" to the "total-sum-of-squares" for an increase in number of clusters may be monitored to identify the $\hat{K}$ number of clusters beyond which a significant drop is not observed. The within-cluster-sum-of-squares alone can also be used as the metric. Alternatively, clustering methods that do not require the specification of the number of clusters may be used such as, for example, hierarchical clustering. At this point, $\hat{K}$ number of clusters are obtained with each having at least P entities.

For clusters with exemplars that are less than P labeled exemplars, case 1b (as described herein) may be applied so as to identify the P exemplars. For each cluster with no labeled exemplars, the present invention may use the set of all given or provided labeled exemplars and then find exemplars in each cluster that are most dissimilar to this provided labeled exemplars set (i.e., pairwise 2 class problem, case 1a).

It should be noted that the present invention is described herein with PAM clustering. However, one or more alternative clustering methods may be adapted and/or configured for use. As such, the mechanisms of the illustrated embodiments provide for recruiting a selected or limited number of SMEs so as to label a small or limited set of class exemplars. One or more operations or functions may measure the distances (or similarities) between entities and generate a distance matrix between the measured distances (or similarities). In the absence of any other information, the most similar/dissimilar exemplars may be selected based on the distance metric.

In one aspect, if exemplar selection is treated as a binary positive-negative exemplar scenario, clustering overhead can be avoided. For example, where exemplars are required for binary treatment of a problem (e.g., exemplars for class-1 and not class-1), clustering (overhead) may not be required for exemplar selection and using the distance matrix may suffice to select a desired number of exemplars of both classes. A multi-class scenario may be treated as N (e.g., N 2-class problems). Where the number of classes in a multi-class data-set is available, clustering may be performed, and exemplar selection from these clusters may be performed in terms of most similar/dissimilar exemplars to the given or provided set of labeled exemplars. After the clustering operation for cases 2 and 3, the problem is reduced to the same solution as in case 1. For example, given a multi-class data-set, the data may be clustered into N clusters (case 2 has N known and case 3 has N unknown); within each cluster exemplar selection is a binary problem of selecting most similar or dissimilar exemplars, which is case 1. Here the number of classes in a multi-class data-set is unknown, the present invention may estimate the number of classes by monitoring the decrease of a clustering quality metric and then apply the ideas from the previous steps.

In one aspect, the mechanisms of the illustrated embodiments provide for one or more alternate sampling operations within each class/cluster. In one aspect, exemplars may be chosen as the most similar exemplars (e.g., same class) or most dissimilar exemplars (e.g., other classes) to a given or provided set of labeled exemplars.

In the absence of any other information, information maximization may be employed so as to extract class exemplars from a large multi-class data-set with the limited or few number of labeled exemplars of one or more classes.

Other sampling methods such as, for example, uniform sampling across a range of dissimilarities may be employed. In another aspect, preferential sampling in a certain range of dissimilarities (e.g., some combination of mildly dissimilar entities and strongly dissimilar entities) may also be utilized. In an additional aspect, it may also be possible that each data within each cluster may be further subject to another clustering operation where the data are grouped into P clusters. If PAM is used, the P medoids may be chosen. If K-Means or other clustering methods are used, the similarity based estimation to pick the most dissimilar datum from each of the P clusters with respect to the set of all labeled exemplars can be done. This may be an additional way of sampling P exemplars of each class of the data-set that involves an additional clustering overhead within each data-cluster.

In one aspect, the mechanisms of the illustrated embodiments provide for one or more alternate methods to deciding the number of clusters such as, for example, when the number of clusters is unknown. For example, the elbow method may be used to estimate the number of clusters for a given data-set. Other methods may be used such as, for example, the Silhouette method and the Information Criterion approach. The Silhouette is a metric that measures the similarity within a cluster compared to the separation between clusters. The Silhouette has a range of [−1, 1] with −1 representing incorrect clustering, 0 representing ambiguous (border-line) clustering, and 1 representing appropriate or "good" clustering. In one aspect, the number of clusters $\hat{K}$ is to be identified or determined such that the average metric for each cluster is maximized, which may be used with both PAM and K-Means clustering.

In one aspect, the information criterion operation may rely on formulating a likelihood (e.g., a percentage) model for the clustering and then optimizing criteria that accounts for both the clustering likelihood and a model-complexity (e.g., number of clusters) penalty. The criteria may include, but is not limited to, a Bayesian Information Criterion and Akaike Information Criterion.

Figure 6:
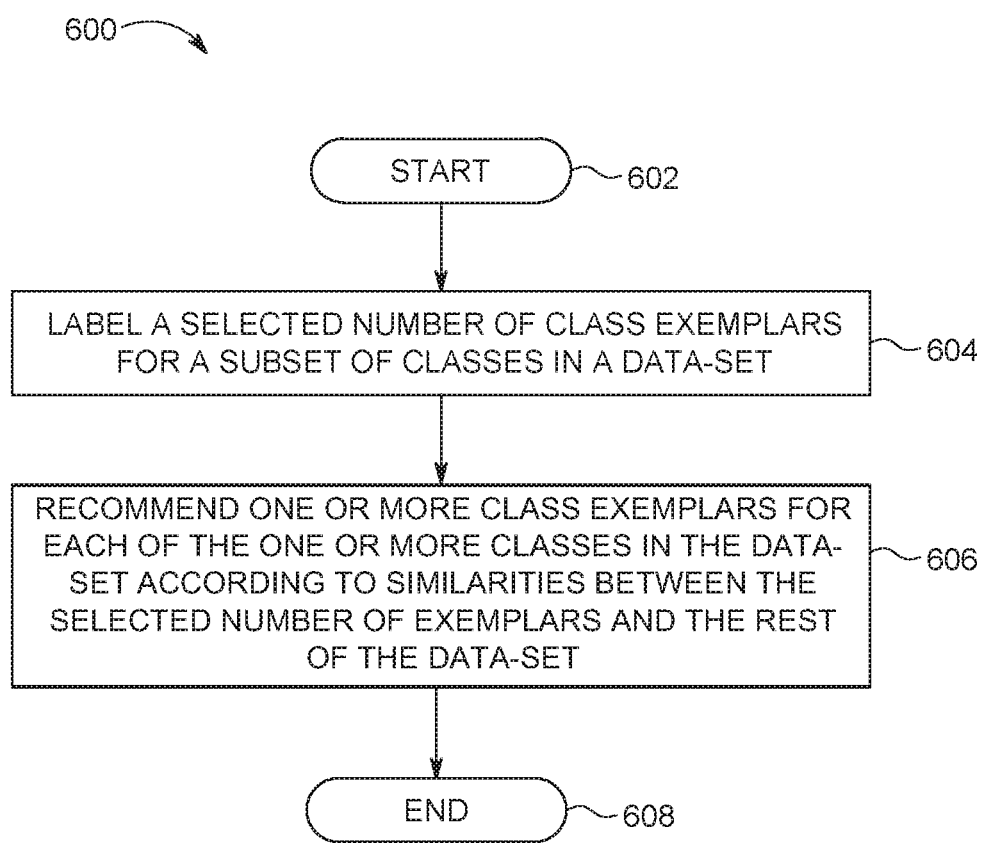
FIG. 6 is a flowchart diagram depicting an exemplary method for recommending exemplars of an unlabeled data-set by a processor; again, in which aspects of the present invention may be realized.

Turning now to FIG. 6, a method 600 for recommending exemplars of a data-set by a processor is depicted, in which various aspects of the illustrated embodiments may be implemented. That is, FIG. 6 is a flowchart of an additional example method 600 for recommending exemplars of a data-set for an unlabeled, multi-class data-set of a particular size in a computing environment according to an example of the present invention. The functionality 600 may be implemented as a method executed as instructions on a machine, where the instructions are included on at least one computer readable medium or one non-transitory machine-readable storage medium. The functionality 600 may start in block 602. A selected number of exemplars may be labeled from one or more classes in a data-set (e.g., an unlabeled data-set), as in block 604. One or more class exemplars for each of the one or more classes in the data-set may be recommended according to similarities between the selected number of exemplars (e.g., the selected number of labeled exemplars) and remaining data of the data-set, as in block 606. The functionality 600 may end in block 608.

In one aspect, in conjunction with and/or as part of at least one block of FIG. 6, the operation of 600 may include one or more of each of the following. The operation of 600 may identify the one or more class exemplars according to the selected number of labeled exemplars from the data-set having a plurality of classes; identify the one or more class exemplars according to the selected number of labeled exemplars from the data-set having a known number of classes; or identify the one or more class exemplars according to the selected number of labeled exemplars from the data-set having an unknown number of classes.

The operation of 600 may label the selected number of exemplars via crowdsourcing. Also, the operation of 600 may identify the similarities, dissimilarities, or a combination thereof between the selected number of exemplars from the subset. The similarities between the selected number of exemplars and the remaining data of the data-set (e.g., an unlabeled data-set) may be learned. The learning, for example, may be used to recommend exemplars from the data that may in turn be used, for example, to train a classifier. The learning may be used to recommend the one or more class exemplars. That is, the trained classifier may recommend the one or more class exemplars. Also, one or more class exemplars may be used as output for one of a plurality of applications (e.g., used in a supervised classification engine).

One or more similarities and dissimilarities between the selected number of exemplars from the subset may be selected using a distance matrix. One or more class exemplars may be used in a classifier. That is, one or more class exemplars identified in the data-set according to the selected number of exemplars from the subset may be used in a classification operation.

The operation of 600 may cluster the selected number of exemplars into one or more clusters to identify similar exemplars or dissimilar exemplars.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks that may be shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for recommending exemplars in an unlabeled data-set by a processor, comprising:
    labeling, at a first time, a selected number of exemplars from one or more classes in a data-set having a plurality of the classes; and
    recommending, at a second time, one or more class exemplars for each of the plurality of classes in the data-set, inclusive of those of the plurality of classes for which no exemplars were labeled at the first time, according to similarities between the selected number of labeled exemplars and remaining data of the data-set; wherein a classifier used to recommend the one or more class exemplars is trained only after learning the similarities between the selected number of labeled exemplars and the remaining data of the data-set using a transductive learning operation such that the similarities are learned notwithstanding whether an explicit model is employed.

2. The method of claim 1, further including:
    identifying the one or more class exemplars according to the selected number of labeled exemplars from the data-set having a plurality of classes;
    identifying the one or more class exemplars according to the selected number of labeled exemplars from the data-set having a known number of classes; or
    identifying the one or more class exemplars according to the selected number of labeled exemplars from the data-set having an unknown number of classes.

3. The method of claim 1, further including labeling the selected number of labeled exemplars from a subset of the one or more classes via crowdsourcing, wherein the data-set is an unlabeled data-set.

4. The method of claim 1, further including identifying the similarities between the selected number of labeled exemplars and the remaining data of the data-set.

5. The method of claim 1, further including identifying dissimilarities between the selected number of labeled exemplars and the remaining data of the data-set.

6. The method of claim 1, further including clustering the selected number of labeled exemplars and the data-set into one or more clusters to identify similar exemplars or dissimilar exemplars.

7. The method of claim 1, further including:
    learning the similarities between the selected number of labeled exemplars and the remaining data of the data-set, wherein the data-set is unlabeled;
    using the learning to recommend the one or more class exemplars; or
    using the one or more class exemplars for one of a plurality of applications.

8. A system for recommending exemplars in an unlabeled data-set in a computing environment, comprising:
    one or more computers with executable instructions that when executed cause the system to:
        label, at a first time, a selected number of exemplars from one or more classes in a data-set having a plurality of the classes; and
        recommend, at a second time, one or more class exemplars for each of the plurality of classes in the data-set, inclusive of those of the plurality of classes for which no exemplars were labeled at the first time, according to similarities between the selected number of labeled exemplars and remaining data of the data-set; wherein a classifier used to recommend the one or more class exemplars is trained only after learning the similarities between the selected number of labeled exemplars and the remaining data of the data-set using a transductive learning operation such that the similarities are learned notwithstanding whether an explicit model is employed.

9. The system of claim 8, wherein the executable instructions when executed cause the system to:
    identify the one or more class exemplars according to the selected number of labeled exemplars from the data-set having a plurality of classes;
    identify the one or more class exemplars according to the selected number of labeled exemplars from the data-set having a known number of classes; or
    identify the one or more class exemplars according to the selected number of labeled exemplars from the data-set having an unknown number of classes.

10. The system of claim 8, wherein the executable instructions when executed cause the system to label the selected number of labeled exemplars from a subset of the one or more classes via crowdsourcing, wherein the data-set is an unlabeled data-set.

11. The system of claim 8, wherein the executable instructions when executed cause the system to identify the similarities between the selected number of labeled exemplars and the remaining data of the data-set.

12. The system of claim 8, wherein the executable instructions when executed cause the system to identify dissimilarities between the selected number of labeled exemplars and the remaining data of the data-set.

13. The system of claim 8, wherein the executable instructions when executed cause the system to cluster the selected number of labeled exemplars and the data-set into one or more clusters to identify similar exemplars or dissimilar exemplars.

14. The system of claim 8, wherein the executable instructions when executed cause the system to:
    learn the similarities between the selected number of labeled exemplars and the remaining data of the data-set, wherein the data-set is unlabeled;
    use the learning to recommend the one or more class exemplars; or
    use the one or more class exemplars for one of a plurality of applications.

15. A computer program product for, by a processor, recommending exemplars in an unlabeled data-set, the computer program product comprising a non-transitory computer-readable storage medium having computer-readable program code portions stored therein, the computer-readable program code portions comprising:

an executable portion that labels, at a first time, a selected number of exemplars from one or more classes in a data-set having a plurality of the classes; and an executable portion that recommends, at a second time, one or more class exemplars for each of the plurality of classes in the data-set, inclusive of those of the plurality of classes for which no exemplars were labeled at the first time, according to similarities between the selected number of labeled exemplars and remaining data of the data-set; wherein a classifier used to recommend the one or more class exemplars is trained only after learning the similarities between the selected number of labeled exemplars and the remaining data of the data-set using a transductive learning operation such that the similarities are learned notwithstanding whether an explicit model is employed.

16. The computer program product of claim 15, further including an executable portion that:

identifies the one or more class exemplars according to the selected number of exemplars from the data-set having a plurality of classes;

identifies the one or more class exemplars according to the selected number of labeled exemplars from the data-set having a known number of classes; or identifies the one or more class exemplars according to the selected number of labeled exemplars from the data-set having an unknown number of classes.

17. The computer program product of claim 15, further including an executable portion that labels the selected number of labeled exemplars from a subset of the one or more classes via crowdsourcing, wherein the data-set is an unlabeled data-set.

18. The computer program product of claim 15, further including an executable portion that:

identifies the similarities between the selected number of labeled exemplars from the subset; or identifies dissimilarities between the selected number of labeled exemplars and the remaining data of the data-set.

19. The computer program product of claim 15, further including an executable portion that clusters the selected number of labeled exemplars and the data-set into one or more clusters to identify similar exemplars or dissimilar exemplars.

20. The computer program product of claim 15, further including an executable portion that:

learns the similarities between the selected number of labeled exemplars and the remaining data of the data-set, wherein the data-set is unlabeled;

uses the learning to recommend the one or more class exemplars; or uses the one or more class exemplars for one of a plurality of applications.

* * * * *